Aug. 2, 1955     A. GRADOFF ET AL     2,714,221
FISH FILLETING MACHINE
Filed June 2, 1952
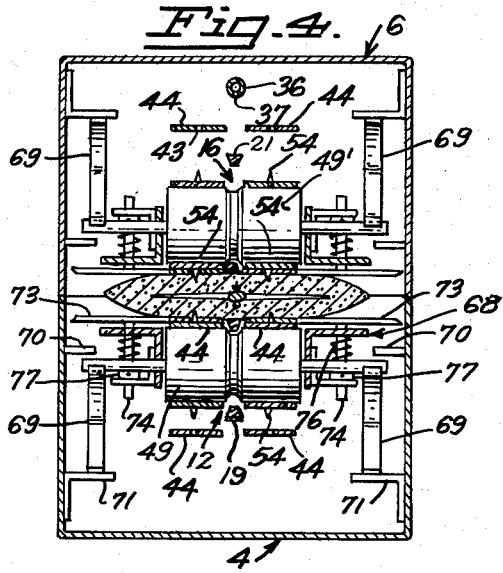
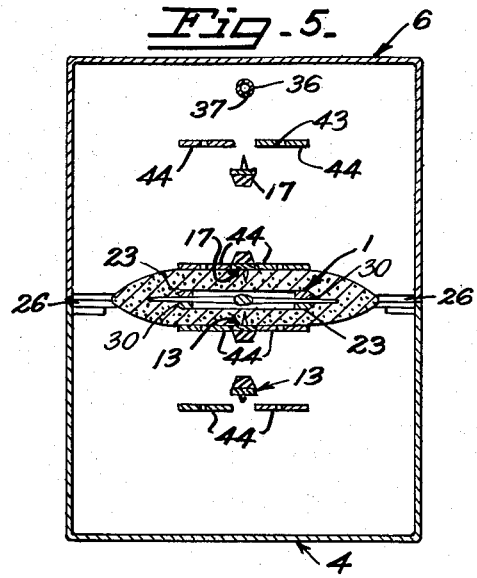
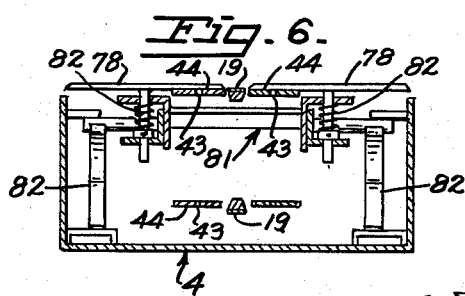
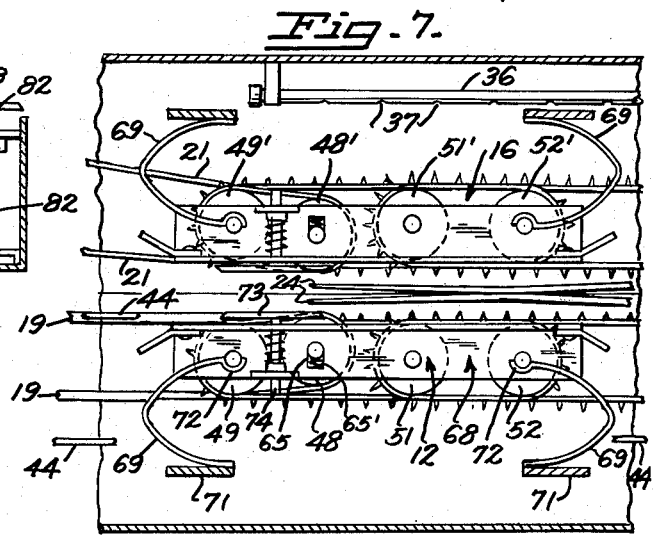
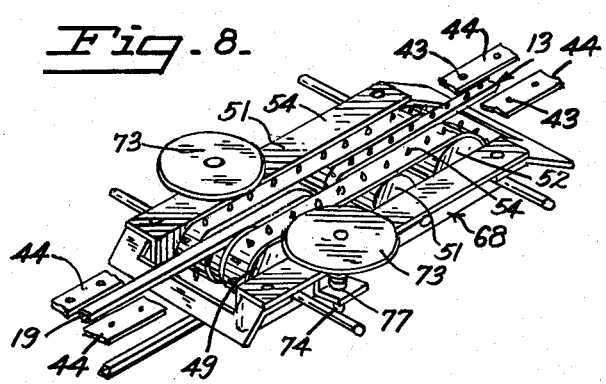
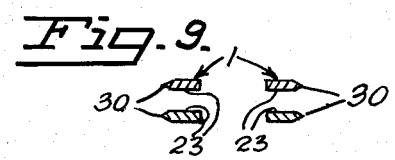
INVENTORS
ALEX GRADOFF
KENNETH W. HOWELL
IVAN VINOFF
BY George B White
ATTORNEY

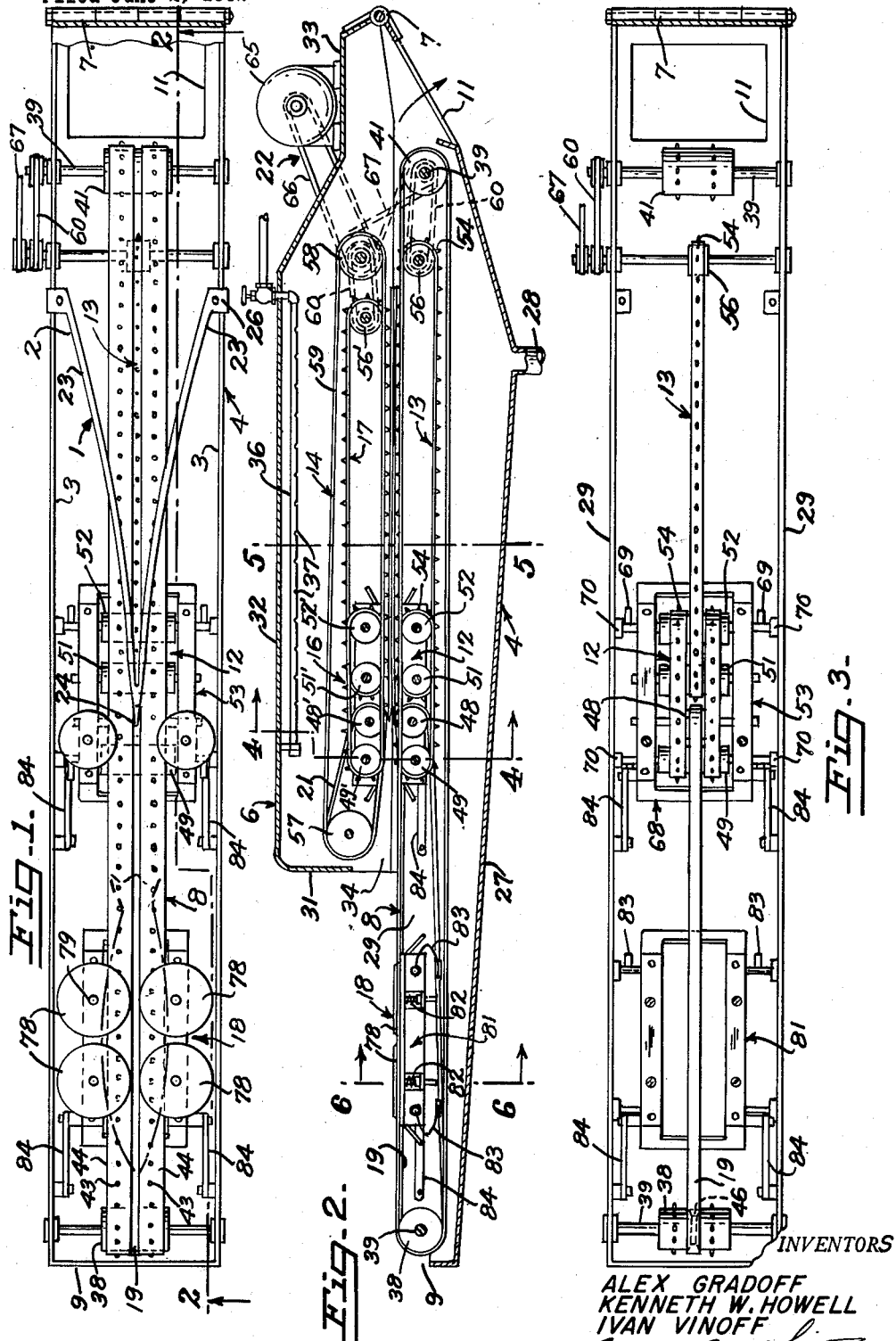

United States Patent Office 2,714,221
Patented Aug. 2, 1955

2,714,221

FISH FILLETING MACHINE

Alex Gradoff, San Francisco, Kenneth W. Howell, San Mateo, and Ivan Vinoff, San Francisco, Calif.

Application June 2, 1952, Serial No. 291,202

15 Claims. (Cl. 17—4)

This invention relates to a fish filleting machine.

At the present time the filleting of fish is accomplished manually by using sharp knives in a correspondingly slow method which involves waste of time, fish meat and labor, and particularly great difficulties occur in case of exceptionally heavy catches.

In general the object of filleting is to sever from the bony structure of a fish, namely from the backbones, the head and the tail, the two edible side portions known as fillets.

Previous attempts with rotary cutters and vertical blades including saw blades did not accomplish the operation with the perfection and efficiency required and still involved waste to a great extent, and frequently they cut the bones into the fillets just as in the manual operation.

The features of our invention are: the provision of a pair of resiliently converging blades, superimposed one upon the other, each blade being generally V-shaped and so arranged that the points of the blades are facing in the direction from which the fish is carried to the blades; the provision of conveying means which straighten out the fish so that it is axially aligned with the points of the blades and is longitudinal with respect to the blades; the provision of aligning means which engage the opposite sides of the fish so as to feed the tough tail portion of the fish between the points of the blades; means operated with and by the conveying means to positively grip and pull the fish past the piercing points of the blades, and other positive grabbing means associated with the conveyor means to pull the fish along the blades so that the bony structure is between the blades while the fillets are on the outside of the respective blades and are positively carried; the provision of the cutting edges on the blades diverging from said piercing points outwardly and so formed that as the fish is passed between and over said blades, the diverging edges of the blades peel off the fillet progressively to the dorsal fins of the fish so that waste is almost entirely obviated; means being provided to support the conveyor means as well as the fish pulling means in such a manner as to permit the adjustment of said conveyor and pulling means to the cross-sectional shape or contour of the fish; the opposite blades and conveying devices on both sides of the fish are inclosed in a casing which is so arranged that the top can be easily swung open; suitable driving mechanism being provided to drive the various conveying and fish pulling means in synchronism.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a top plan view of the lower part of our filleting machine.

Fig. 2 is a sectional view of our machine, the section being taken on lines 2—2 of Fig. 1.

Fig. 3 is a top plan view of the lower part shown in Fig. 1 with the long conveyors removed.

Fig. 4 is a cross sectional view of our machine, the section being taken on lines 4—4 of Fig. 2 on an enlarged scale.

Fig. 5 is a cross-sectional view of our machine, the section being taken on lines 5—5 of Fig. 2 on an enlarged scale.

Fig. 6 is a cross-sectional view of the lower part of our machine, the section being taken on lines 6—6 of Fig. 2 on an enlarged scale.

Fig. 7 is a fragmental enlarged view, partly in section, of the conveyors system and cradle support near the tips of the blades.

Fig. 8 is a perspective view of the middle portion of the lower conveyor system near the points of the blades on an enlarged scale, and Fig. 9 is a fragmental, sectional detail view of the blades showing the angles of the peeling edges thereof.

In carrying out our invention we make use of a pair of superimposed generally V-shaped blades 1 the broader ends 2 of which are secured on the meeting edges 3 of a lower housing section 4. The lower housing section 4 and an upper housing section 6 are hollow shells and are connected to one another by a hinge 7 at the discharge ends thereof so that the upper housing section can be opened up permitting access to the mechanism within the shells.

Within the lower housing section 4 is arranged longitudinally with respect to the lower blade 1 a conveyor mechanism 8 which extends from the intake end 9 of the lower housing 4 to a point adjacent a discharge or outlet opening 11 of the lower housing.

Along the conveyor mechanism 8 are arranged gripping conveyor devices 12 moving toward the points of the blades 1 so as to pull the fish past the points of the blades. Also longitudinally with respect to the blades is arranged a gripping and pulling device 13 arranged between the diverging legs of the lower blade for engaging and positively pulling the fish along the entire length of the blades.

The top or upper housing section 6 is, in the present illustration, shorter than the lower section so as to leave exposed a portion of the lower conveyor mechanism 8 thereby to facilitate the depositing of the fish thereon. In the upper housing there is also a conveyor mechanism 14 extending from the forward end toward the discharge end of the housing also longitudinally with respect to said blades 1. A shorter or central gripping conveyor mechanism 16 is arranged immediately preceding and passing the points of the blades within the said conveyor mechanism 14. A longer gripping and pulling mechanism 17 is longitudinally arranged for engaging the upper part of the fish to pull it and it is arranged between the diverging legs of the upper blade.

A suitable aligning mechanism 18 is provided on the intake end of the conveyor to align and keep the fish longitudinally with respect to the conveyor and with the respect to said blades.

A central friction driven narrow belt 19 between the parallel conveyors of the conveyor mechanism 8 terminates at about the points of the blades 1 to hold the fish in such manner that the bone structure is aligned with the spacing between the points of the blades. A similar friction driven guiding belt 21 in the middle of the upper conveyors 14 is resiliently guided toward the lower narrow belt 19 so as to definitely center and locate the fish with respect to the points of the blades 1.

The conveyor mechanisms and gripping mechanisms are rotated in synchronism by a suitable driving mechanism 22 so that the engagement and movement of the fish at the top and bottom is at the same speed.

In detail each blade is made of a pair of converging legs 23. The legs are joined together into a sharp point 24. Each leg is slightly arcuate between the point 24 and an enlarged rear boss 26, which latter is suitably and fixedly mounted upon the edges 3 of the lower housing section so that the blades extend longitudinally of the housing with the points 24 being generally centrally located with respect to the said housing section. The legs 23 of the blades are symmetrical and they flare outwardly to the full width of the housing so that they can cut or peel the fillets through the entire width of the fish. The outer edges 30 of each blade leg and point are tapered transversely to a cutting edge. The side of each cutting edge facing toward the adjacent conveying mechanism, or away from the other blade 1 is longer than the converging side of the cutting edge adjacent to the opposite leg 1. In other words, the inner sides of the cutting edges of the blades which face one another are narrower and somewhat deeper than the outer converging sides of the same cutting edges, so that the inner sides of the cutting edges ride over the dorsal joints without cutting the bones. The blades are made of firm but springy material. The blades 1 are so mounted that they converge or spring toward one another so as to touch at points spaced from the piercing points 23 so as to keep the piercing points 24 spaced for receiving the tail fin of the fish therebetween and as the bony structure of the fish is forced between the points 24 of the blades 1, then the blades are sprung apart sufficiently to allow the bony structure to pass between the blades while the fillets pass over the outsides of the opposite blades.

The lower housing section 4 has a bottom 27 which is inclined both from the front and the outlet end downwardly toward a drain 28. The intake end 9 extends vertically at the front. The outlet end is formed by the upwardly extended portions of the bottom between the drain 28 and the hinge 7, the outlet opening 11 being near the hinge 7. Vertical sides 29 extend from the bottom to inclose the lower housing. The meeting edges 3 through which the blades 1 are secured are the upper edges of the vertical sides 29. The upper housing section 6 has a front shield end 31, a top 32 which downwardly inclines toward a generally horizontal platform 33 near the hinge 7, on which platform 33 is supported the power driving mechanism 22 of the machine. Vertical sides 34 of the upper housing section 6 are in registry with the vertical sides 29 of the lower housing section so as to inclose completely a shell when the top housing section is in closed position. In the upper housing section and near the top thereof is a spray pipe 36 with spray nozzles 37 downwardly directly therefrom for washing the feeding conveyor and the blades.

The conveyor mechanism 8 in the lower housing section 4 includes a sprocket drum 38 on a shaft 39 which latter is suitably journalled in the vertical sides 29 of the lower housing section 4. Another sprocket drum 41 near the outlet opening 11 is similarly held on a shaft 39 journalled in the vertical sides 29 of said lower housing section. Each sprocket drum 38 and 41 has spaced sprocket teeth formed thereon for engagement with equally spaced perforations 43 on belts 44 made of suitable material. There are two such conveyor belts 44 parallel and spaced from one another on the respective drums. In the middle of the sprocket drum 38 is a V-shaped circular groove 46 to accommodate the lower V-belt 19 for frictional drive therein. The perforated belts 44 extend the whole length of the lower housing section 4 from about its intake end 9 to the outlet opening 11. The V-belt 19 extends from the sprocket drum 38 at the intake end 9 to a driven narrow V roller 48 immediately below the point of the lower blade 1 so as to be in engagement with the middle portion of the fish and in alignment with said blade point. The width of the middle roller 48 is less than the space between the belts 44. Spaced between said middle driven roller 48 and the front sprocket drum 38 is another roller 49. Between the driven roller 48 and the other or rear sprocket drum 41 are two more spaced rollers 51 and 52. All four rollers 48, 49, 51 and 52 are mounted on a yieldable or resilient supporting structure 53 to be hereinafter described. On the extreme end rollers 49 and 52 are a pair of gripping conveyors or belts 12. Each gripping conveyor or belt is positioned under the adjacent perforated conveyor belt 44, and has barbs or claws 54 extended therefrom at the same longitudinal spacing as the spacing between the adjacent perforations 43 of the respective perforated belts 44 so that the perforated belts 44 drive the barbed belts 12 and the barbs or claws 54 project to and above the respective perforations 43 to engage the skin and sometimes the flesh of the fish and positively drive the fish against and into the penetrating points 24 of the blades 1. The length of the gripping or barbed conveyors 12 and the location of the distance between the outer rollers 49 and 52 are such that the gripping of the fish begins somewhat in advance of the blade points 24 and the prongs disappear below the conveyor belts 44 before they would contact or touch the diverging legs 23 of the blades.

A central narrow conveyor 13 extends from the intermediate roller 51 to a roller 56 spaced from the rear sprocket drum 41 between the perforated belts 44. This narrow conveyor or belt 13 also has barbs or claws 54 extended therefrom to penetrate into the underside of the fish. This gripping or pulling conveyor 13 pulls the fish along the blades 1. The spacing is such that the roller 51 is substantially below the narrow end of the converging space between the legs so that the barbs or claws 54 of the pulling device or conveyor 13 appear and engage the fish without tangling with the blade points 24.

In the upper housing section 6 there is also a forward sprocket drum 57 and a rearward sprocket drum 58 over which are placed spaced perforated conveyor belts 59 spaced and driven identically to the lower perforated belt 44. There is a V belt 21 arranged similarly to the lower V belt 19 extended from the front sprocket drum 57. An identical arrangement of spaced rollers 48', 49', 51' and 52' are arranged symmetrically with the lower rollers 48, 49, 51 and 52 to carry thereon the barbed conveyors 16 driven through the perforations of the perforated belts in the same manner as described in the lower structure. The narrower barbed or pronged belt 17 extends from a roller 56' spaced from the rear sprocket drum 58 and over the roller 52' between the adjacent blade legs 23 to engage and pull the upper portion of the fish in the manner heretofore described.

The driven roller 48' extends downwardly to act as a guide to the vicinity of the point 24 of the upper blade 1 so as to yieldably guide the tail of the fish in alignment with the center of the space between the blades 1. In other words, the fish is lightly pressed between the lower V belt 19 and upper V belt 21 and is aligned with the respective points 24 of the blades 1, but as the body of the fish advances, it spreads the V belts apart and exposes the points so as to permit the fillets on both sides to remain outside of the blades 1.

The driving mechanism 22 includes a suitable electric motor 65 which is connected by suitable drive transmission 66 to the shaft of the upper rear sprocket drum 57. Another transmission 67 extends from the first transmission 66 to drive the shaft of the lower rear sprocket drum 41. Still another transmission 60 connects respectively from the lower rear sprocket drum 41 to the shaft of the roller 56 and from the upper rear sprocket drum 48 to the roller 56' to drive the longer gripping or barbed belts 13 and 17 respectively. As heretofore described, the perforated belts 44 and 59 drive the barbed gripping conveyors 13 and 16 respectively through the perforations and claws.

The resiliently yieldable support structure 53 for supporting the set of rollers 48, 49, 51 and 52 includes a cradle frame 68 in which all these middle rollers are suitably journalled. The shaft of the V roller is slidably journalled in vertical slots 65 and pressed by coil springs 65' toward the blade points. The cradle frame 68 in turn rests upon two pairs of half bow springs 69 the open ends of which rest upon a supporting ledge 71 on the bottom of the lower housing section. The middle on the top of each spring has a bearing dent 72 therein. The ends of the adjacent shafts of the adjacent rollers nestle in said bearing dents supporting the entire cradle frame and all the rollers thereon resiliently, and normally urging the entire support and the belt structure toward the adjacent blades 1. Abutment lugs 70 on the housing sides respectively above the journalled roller shafts limit the upward movement of the cradle frame so as to keep the belts in an initial spaced position with respect to the blades. The cradle frame and the rollers in the top section are supported identically with the yieldable supports hereinabove described.

The outer portions of the perforated belts above the cradle frame are held aligned by disks 73 on stems 74 journalled in side members of the cradle frame 68 and are urged downwardly by coil springs 76 each bearing against the cradle frame member at one end thereof and against the collar 77 on said stem at its other end so as to hold the outer edge of said belt down, and prevent the cutting of the belt by the blades.

The fish is straightened out on the intake portion of the lower conveyor mechanism by means of two pairs of opposed disks 78 which extend over the perforated belts. Stems 79 extend from said disks and are journalled in another cradle structure 81 and are pressed downwardly by coil springs 82 in the same manner as heretofore described in connection with the previous aligning stems and disks. This cradle structure 81 is supported on bow springs 83 arranged in the same manner as the bow springs heretofore described. In this manner the support is resilient yet the frictional contact between the disks 78 and the perforated conveyors causes the opposite sets of disks to rotate in opposite directions thereby frictionally aligning and straightening the fish axially over the middle of the conveyor system and opposite the respective points of the blades. All cradle frames are suitably anchored by the bars 84 connected to the respective housing sections to prevent their shifting with the conveyors.

In operation the fish is placed on the exposed portion of the lower conveyor mechanism 8 and is straightened by the disks 78, tail first toward the blade point 24. As the fish approaches the blade points the middle gripping conveyors 12 and 16 engage the fish positively and force it into the piercing points 24 and along the conveying portions of the blades 1. The V belts 19 and 21 center the tail of the fish and guide it between the blade points 24 and yield as the fleshy portion of the fish is passed between them. The portion of the fish past the converging points and along the blade legs 23 is then grabbed by the barbs of the rear barbed conveyors 13 and 17 and the fish is thus pulled and carried along the widening portions of the blades 1 the outer edges of which latter peel off the fillets from the bone structure outwardly past the dorsal fins, and even peel off the skin from the dorsal fins. The piercing blade points pierce the head bones from the rear and shear off the sides of the head. The fillets and the bone structure are freed from the rear barbed belt prior to reaching the end of the lower perforated conveyors so that the filleted fish is ejected at the rear downward turn of the perforated conveyors and through the outlet opening 11 of the lower housing 4. The operation is simple, fully automatic, flexible to handle fish of varying thickness and width. The machine does not require any adjustment and is easily inspected and cleaned by swinging the top housing with the top mechanism in it upwardly about the housing hinge.

We claim:

1. In a fish filleting machine generally parallel spaced superimposed conveyors, pair of substantially flat blades between said parallel conveyors, each blade being substantially parallel to said conveyors and generally V-shaped the apex thereof forming a point on each blade facing in the direction from which the fish is carried between said conveyors, each of said blades having cutting edges diverging from said points to a width wider than the width of the average fish passing through said machine, and means to support the wider portions of said blades generally fixedly with respect to said conveying means.

2. In a fish filleting machine generally parallel spaced superimposed conveyors, pair of substantially flat blades between said parallel conveyors, each blade being substantially parallel to said conveyors and generally V-shaped the apex thereof forming a point on each blade facing in the direction from which the fish is carried between said conveyors, each of said blades having cutting edges diverging from said points to a width wider than the width of the average fish passing through said machine, and means to support the wider portions of said blades generally fixedly with respect to said conveying means, the said blades being resiliently yieldable apart from one another to accommodate the bony structure of the fish therebetween.

3. In a fish filleting machine generally parallel spaced superimposed conveyors, pair of substantially flat blades between said parallel conveyors, each blade being substantially parallel to said conveyors and generally V-shaped the apex thereof forming a point on each blade facing in the direction from which the fish is carried between said conveyors, each of said blades having cutting edges diverging from said points to a width wider than the width of the average fish passing through said machine, and means to support the wider portions of said blades generally fixedly with respect to said conveying means, the said blades being resiliently yieldable apart from one another to accommodate the bony structure of the fish therebetween, and gripping means moving in synchronism with said conveying means and parallel with the planes of said blades for penetrating and gripping opposite sides of the fish for pulling said fish past said points and along said blades.

4. In a fish filleting machine generally parallel spaced conveyors including gripping means and having a feeding and a discharge end, pair of blades between said parallel conveyors, each blade being generally V-shaped the apex thereof forming a point on each blade facing in the direction from which the fish is carried between said conveyors, each of said blades having cutting edges diverging from said points to a width wider than the width of the average fish passing through said machine, and means to support the wider portions of said blades generally fixedly with respect to said conveying means, and a housing surrounding said conveying means and said blades, said housing having an outlet opening at said discharge end, said housing being made of upper and lower separable sections, one of said conveyor means and gripping means being in the lower section and the other conveyor means and gripping means being in the upper housing section and being separable from the first mentioned conveyor means and gripping means.

5. In a fish filleting machine generally parallel spaced conveyors including gripping means, pair of blades between said parallel conveyors, each blade being generally V-shaped the apex thereof forming a point on each blade facing in the direction from which the fish is carried between said conveyors, each of said blades having cutting edges diverging from said points to a width wider than the width of the average fish passing through said machine, and means to support the wider portions of said blades generally fixedly with respect to said conveying means, and a housing surrounding said conveying means and said blades, said housing having an intake end and an outlet opening at opposite ends of said conveyors, said housing being made of upper and lower separable sections, one of said conveyor means and gripping means being in the lower section and the other of said conveyor means and gripping means adjacent thereto being in the upper housing section and being separable from the first mentioned conveyor means and gripping means, the upper housing section being shorter than the lower housing section at the intake end thereof and the conveyor means in the lower housing section being extended into said longer housing section to permit the depositing of the fish upon the lower conveyor.

6. In a fish filleting machine generally parallel spaced superimposed conveyors, pair of substantially flat blades, and means to support said blades stationarily between said parallel conveyors, each blade being substantially parallel to said conveyors and generally V-shaped with the points on each blade facing in the direction from which the fish is carried between said conveyors, each of said blades having cutting edges diverging from said points to a width wider than the width of the average fish passing through said machine, the outer cutting edges of each of said blades being inclined at a flatter angle on the sides thereof farthest from the other blade.

7. In a fish filleting machine, a pair of superimposed blades arranged in generally parallel planes, outer cutting edges of each blade converging to an apex generally in said respective planes, a piercing point formed at each apex, and fish conveyor means moving on a path generally parallel with and spaced from the planes of the respective blades and oppositely to the direction of said points to convey fish against and unto said piercing points and then along said blades, said cutting edges on each of said blades diverging generally in said plane from said respective points to a width wider than the usual width of the fish conveyed thereto so as to peel the fillets from the opposite sides of the bone structure of said fish.

8. In a fish filleting machine, a pair of superimposed blades arranged in generally parallel planes, outer cutting edges of each blade converging to an apex generally in said respective planes, a piercing point formed at each apex, and fish conveyor means moving on a path generally parallel with and spaced from the planes of the respective blades and oppositely to the direction of said points to convey fish against and unto said piercing points and then along said blades, said cutting edges on each of said blades diverging generally in said plane from said respective points to a width wider than the usual width of the fish conveyed thereto so as to peel the fillets from the opposite sides of the bone structure of said fish, and means to support the wider end of said blades stationarily with respect to said conveying means, said blades being resiliently yieldable to firmly conform the space between the blades to the bone structure of said fish.

9. In a fish filleting machine, a pair of superimposed blades arranged in generally parallel planes, outer cutting edges of each blade converging to an apex generally in said respective planes, a piercing point formed at each apex, and fish conveyor means moving on a path generally parallel with and spaced from the planes of the respective blades and oppositely to the direction of said points to convey fish against and unto said piercing points and then along said blades, said cutting edges on each of said blades diverging generally in said plane from said respective points to a width wider than the usual width of the fish conveyed thereto so as to peel the fillets from the opposite sides of the bone structure of said fish, each of said blades including a pair of elements arranged generally in V-shape in a plane parallel with the path of the fish on said conveyor means, the apex of said V-shape forming said piercing point and facing in the direction from which the fish approaches said blades.

10. In a fish filleting machine, a pair of superimposed blades arranged in generally parallel planes, outer cutting edges of each blade converging to an apex generally in said respective planes, a piercing point formed at each apex, and fish conveyor means moving on a path generally parallel with and spaced from the planes of the respective blades and oppositely to the direction of said points to convey fish against and unto said piercing points and then along said blades, said cutting edges on each of said blades diverging generally in said plane from said respective points to a width wider than the usual width of the fish conveyed thereto so as to peel the fillets from the opposite sides of the bone structure of said fish, each of said blades including a pair of elements arranged generally in V-shape in a plane parallel with the path of the fish on said conveyor means, the apex of said V-shape forming said piercing point and facing in the direction from which the fish approaches said blades, means at the wider ends of said blades to hold said wider ends fixed relatively to said conveying means, and said blades being resiliently yieldable to firmly conform the space between the blades to the bony structure of said fish.

11. In a fish filleting machine, a pair of superimposed blades arranged in generally parallel planes, outer cutting edges of each blade converging to an apex generally in said respective planes, a piercing point formed at each apex, and fish conveyor means moving on a path generally parallel with and spaced from the planes of the respective blades and oppositely to the direction of said points to convey fish against and unto said piercing points and then along said blades, said cutting edges on each of said blades diverging generally in said plane from said respective points to a width wider than the usual width of the fish conveyed thereto so as to peel the fillets from the opposite sides of the bone structure of said fish, said conveyor means including perforated conveyor elements, and auxiliary conveyor means adjacent the said points of said blades having claw elements formed thereon in the same spaced relation as the spacing between the perforations of said perforated element and extending through said perforations to penetrate into the said fish.

12. In a fish filleting machine, a pair of superimposed blades arranged in generally parallel planes, outer cutting edges of each blade converging to an apex generally in said respective planes, a piercing point formed at each apex, and fish conveyor means moving on a path generally parallel with and spaced from the planes of the respective blades and oppositely to the direction of said points to convey fish against and unto said piercing points and then along said blades, said cutting edges on each of said blades diverging generally in said plane from said respective points to a width wider than the usual width of the fish conveyed thereto so as to peel the fillets from the opposite sides of the bone structure of said fish, said conveyor means including perforated conveyor elements, and auxiliary conveyor means adjacent the said points of said blades having claw elements formed thereon in the same spaced relation as the spacing between the perforations of said perforated element and extending through said perforations to penetrate into the said fish, and perforated conveyor elements on the opposite side of the pairs of blades.

13. In a fish filleting machine, a pair of superimposed blades arranged in generally parallel planes, outer cutting edges of each blade converging to an apex generally in said respective planes, a piercing point formed at each apex, and fish conveyor means moving on a path generally parallel with and spaced from the planes of the respective blades and oppositely to the direction of said points to convey fish against and unto said piercing points and then along said blades, said cutting edges on each of said blades diverging generally in said plane from said respective points to a width wider than the usual width of the fish conveyed thereto so as to peel the fillets from the opposite sides of the bone structure of said fish, said conveying means adjacent the said points of said blades having claw elements formed thereon to penetrate into the said fish, and opposite guiding elements associated with said conveyor means converging together to the penetrating points of said blades on the opposite sides thereof for guiding the fish aligned with the points of said blades.

14. In a fish filleting machine, a pair of superimposed blades arranged in generally parallel planes, outer cutting edges of each blade converging to an apex generally in said respective planes, a piercing point formed at each apex, and fish conveyor means moving on a path generally parallel with and spaced from the planes of the respective blades and oppositely to the direction of said points to convey fish against and unto said piercing points and then along said blades, said cutting edges on each of said blades diverging generally in said plane from said respective points to a width wider than the usual width of the fish conveyed thereto so as to peel the fillets from the opposite sides of the bone structure of said fish, auxiliary conveyor means adjacent the said points of said blades having claw elements formed thereon to penetrate into the said fish, and other auxiliary conveyor means beyond the points of the blades in the direction of the moving of the fish and on the opposite sides of said blades having penetrating points thereon for gripping said fish on the opposite sides thereof and pulling it along said blades.

15. In a fish filleting machine, a pair of superimposed blades arranged in generally parallel planes, outer cutting edges of each blade converging to an apex generally in said respective planes, a piercing point formed at each apex, and fish conveyor means moving on a path generally parallel with and spaced from the planes of the respective blades and oppositely to the direction of said points to convey fish against and unto said piercing points and then along said blades, said cutting edges on each of said blades diverging generally in said plane from said respective points to a width wider than the usual width of the fish conveyed thereto so as to peel the fillets from the opposite sides of the bone structure of said fish, auxiliary conveyor means adjacent the said points of said blades having claw elements formed thereon to penetrate into the said fish, and other auxiliary conveyor means beyond the points of the blades in the direction of the moving of the fish and on the opposite sides of said blades having penetrating points thereon for gripping said fish on the opposite sides thereof and pulling it along said blades, said last conveyor means being central with respect to said first conveyor means and being generally in registry with the middle portions of said blades.

References Cited in the file of this patent

UNITED STATES PATENTS

| | | |
|---|---|---|
| 133,855 | Hatch | Dec. 10, 1872 |
| 2,031,856 | Rowton et al. | Feb. 25, 1936 |
| 2,292,696 | Jensen | Aug. 11, 1942 |
| 2,304,880 | Brown et al. | Dec. 15, 1942 |
| 2,582,636 | Kruse et al. | Jan. 15, 1952 |
| 2,612,652 | Berglund | Oct. 7, 1952 |
| 2,659,930 | Jagger | Nov. 24, 1953 |
| 2,669,269 | Schmidt | Feb. 16, 1954 |

FOREIGN PATENTS

| | | |
|---|---|---|
| 250,784 | Italy | Nov. 11, 1926 |
| 51,931 | Denmark | July 27, 1936 |
| 119,917 | Sweden | Aug. 7, 1947 |